Patented Feb. 10, 1948

2,435,695

UNITED STATES PATENT OFFICE 2,435,695

CATALYTIC ISOMERIZATION OF UNSATURATED GLYCERIDE OILS

Charles J. Plank, Woodbury, N. J., assignor to Socony-Vacuum Oil Company, Incorporated, a corporation of New York No Drawing. Application July 13, 1944, Serial No. 544,820

10 Claims. (Cl. 260—405.6)

This invention relates to a process for the production of polyene compounds having conjugated double bonds from polyene compounds having unconjugated double bonds, and is more particularly concerned with the provision of new catalysts capable of promoting structural isomerization reactions wherein the position of the unsaturated linkages is involved.

As is well known in the art, compounds are said to be isomeric when they are composed of the same elements in the same proportion by weight, but have different properties. Such compounds are referred to as isomers and the reaction conditions of temperature, time, etc., of processes that cause the transformation of one isomer into another, and accordingly called isomerization processes, are broadly referred to as isomerizing conditions. Structural isomerism is one type and connotes isomerism which involves compounds having the same empirical formulas and identical molecular formulas, but which have different structures and, consequently, different properties. Structural isomerism is referred to as position isomerism when the isomerism is due to different possible allocations, in a given carbon chain, of the functional group or groups. The transformation of polyene compounds having unconjugated double bonds into polyene compounds having conjugated double bonds, is a typical example of position isomerism.

It is also well known to those familiar with the art, that isomerization operations may be conducted in the presence of substances that promote the isomerization reaction. These substances are referred to as isomerization catalysts and operations involving the use of these substances are known as catalytic isomerizations, as distinguished from operations wherein no isomerization catalysts are employed, and which are referred to in the art, as thermal isomerizations. Two of the noteworthy requisites of catalysts are that the reaction they catalyze must have no effect on the catalysts, and that the reaction products must be unaffected by the catalysts.

The production of polyenes having conjugated double bonds from their unconjugated isomers has been studied extensively. For instance, it is known that linoleic acid may be isomerized to a conjugated fatty acid by heating in the substantial absence of water and in the presence of excess amounts of basic reagents, such as sodium in butyl alcohol. Linseed, soya bean, sardine and dehydrated castor oil acids have been partially isomerized by heating in the presence of aqueous solutions of sodium hydroxide. It must be noted, however, that in these prior art processes, the fatty acids, rather than the glycerides, were isomerized. From the standpoint of drying oil manufacture, this represents a decided disadvantage.

In the drying oil and varnish industries, it is well recognized that the bodying and drying properties of a drying oil or of a varnish made therefrom, are very closely related to the degree of conjugation of the unsaturated linkages in the glyceride molecules. Therefore, the importance of processes that will cause even a partial conjugation of the unconjugated glyceride molecules present in semi-drying oils, such as linseed oil, soya bean oil, and the like, is obvious. Further, since the drying properties of drying oils or of varnishes made therefrom, are easily measured, they can be used as a measure of the degree of conjugation produced in the isomerization treatment of oils containing unconjugated isomers.

I have discovered that China-wood oil gels are effective isomerization catalysts.

I have found that the isomerization of semi-drying oils may be effected through the use of China-wood oil gels.

It is an object of the present invention to provide a process for catalytically promoting isomerization reactions. Another object is to provide an efficient process for the production of polyene compounds having conjugated double bonds from polyene compounds having unconjugated double bonds. A very important object is to afford a process for effecting the isomerization of unconjugated glyceride molecules present in semi-drying oils into conjugated glyceride molecules. A more specific object is to provide a process capable of carrying out the above objects by using new isomerization catalysts. Other objects and advantages of the present invention will become apparent to those skilled in the art from the following description.

Broadly stated, the present invention provides a process for effecting the isomerization of polyene compounds having unconjugated double bonds into polyene isomers having conjugated double bonds, which comprises contacting the polyene compounds having unconjugated double bonds with a boron trifluoride-bodied China-wood oil gel, under isomerization reaction conditions.

Hard, friable gels may be produced from drying oils, such as oiticica oil, dehydrated castor oil, China-wood oil and the like, by adding small amounts of boron trifluoride or boron trifluoride-etherate to the oils. China-wood oil may be converted to a similar gel by heat alone. However, while heat-bodied China-wood oil gels and boron trifluoride-bodied oiticica oil gels and dehydrated castor oil gels may be dissolved in linseed oil or other drying or semi-drying oils, by grinding into a fine powder, mixing with the oil, and heating to a temperature of about 500° F., boron trifluoride-bodied China-wood oil gels cannot be so dissolved.

The new isomerization catalysts of my invention are the boron trifluoride-bodied China-wood oil gels. These gels are obtained by treating China-wood oil with boron trifluoride or with boron trifluoride-etherate, in amounts to produce a boron trifluoride-content in the oil, that ordinarily varies between about 0.02% and about 2.0%, based on the weight of the oil. The gelation may be hastened, particularly where small amounts of boron trifluoride or of boron trifluoride-etherate are employed, by heating the mixture to temperatures of up to about 400° F. The gel obtained should be hard and friable. Prior to use in the isomerization operation, the gel is ground to a fine powder. The following procedures are given by way of non-limiting examples only, and illustrate the preparation of China-wood oil gels in accordance with my invention, containing varying amounts of boron trifluoride:

EXAMPLE 1

300 grams of China-wood oil were placed in a beaker and while stirring vigorously, a sufficient amount of boron trifluoride-etherate to yield a boron trifluoride-content of 0.1% by weight, was added from a measuring pipette. Stirring was stopped and the mixture was allowed to stand overnight. The mixture which had not as yet gelled, was heated at a temperature of 200° F. for 10 minutes and then was allowed to stand for another day. The gel thus obtained was quite hard and could be ground into a very fine white powder.

EXAMPLE 2

300 grams of China-wood oil were placed in a beaker and while stirring vigorously, a sufficient amount of boron trifluoride-etherate to yield a boron trifluoride-content of 0.6% by weight, was added from a measuring pipette. Stirring was stopped and the mixture after standing overnight, gelled into a hard friable gel which could be ground into a fine white powder.

EXAMPLE 3

300 grams of China-wood oil were placed in a beaker and while stirring vigorously, a sufficient amount of boron trifluoride-etherate to yield a boron trifluoride-content of 1.0% by weight, was added from a measuring pipette. Stirring was stopped and the mixture after standing overnight, gelled into a hard friable gel which could be ground into a fine white powder.

The gels of my invention find particular application in the preparation of bodied oils and varnishes from the slower drying oils nad semi-drying oils, such as linseed oil. The advantages of a process which permits the replacement of an active drying oil (e. g. tung oil) in whole or in part by a less active and more readily available oil, are obvious. I have prepared ester gum varnishes from oils treated in accordance with the process of my invention, which compare very favorably with commercial tung oil-ester gum varnishes prepared by conventional means. Typical results are set forth hereinafter.

In accordance with the present invention, when semi-drying oils, such as linseed oil, are heated in the presence of fine particles of my boron trifluoride-bodied China-wood oil gels, oils that are much faster drying than oils bodied by conventional means, are produced. The time required for bodying is also substantially reduced.

The boron trifluoride-bodied China-wood oil gels are insoluble in the oils, particularly in linseed oil, and may be readily filtered out of the oils after treatment thereof. The following example is given as evidence of the insolubility of the gels of my invention, in semi-drying oils:

EXAMPLE 4

45 grams of comminuted boron trifluoride-bodied China-wood oil gel were added to 125 grams of a specially bodied varnish maker's linseed oil, and the mixture was heated to a temperature of 520° F. in ½ hour and kept at that temperature for 3 hours. Heating was stopped, 10 grams of filter-aid (Hi-Flo) were added to the mixture and the mixture was filtered through a No. 1 Whatman filter paper. The material on the filter paper was washed with petroleum ether until the gel thereon was as white as it had been before the test. A 100% recovery of the gel and filter-aid was obtained.

It is apparent, therefore, that the insoluble boron trifluoride-bodied China-wood oil gels of my invention, meet the definition of a catalyst as set forth hereinbefore. Evidently, these gels constitute catalysts of the surface-active type, and do not represent merely another way of introducing boron trifluoride into a reaction mixture. Since gaseous boron trifluoride and liquid boron trifluoride-etherate, are soluble in drying or semi-drying oils, they act as homogeneous catalysts when mixed with drying or semi-drying oils, while the gels of my invention, obviously, are heterogeneous catalysts. The same gel sample may be used repeatedly, with the same results being produced in each case.

EXAMPLE 5

The gel and filter-aid recovered in Example 4, were mixed with 80 grams of a specially bodied varnish maker's linseed oil. The mixture was heated to a temperature of 535° F. in ½ hour and kept at that temperature for 3 hours. The product obtained was too viscous for filtering and accordingly, was diluted with a small amount of petroleum ether. The mixture was filtered to separate the gel and filter-aid. After topping off the petroleum ether, the bodied oil had an iodine number of 122 as compared to 128 for the oil produced in Example 4.

The boron trifluoride is so firmly tied up with the gel that it cannot be extracted even by boiling with alcohol-water mixtures. This is substantiated by the results of the following example:

EXAMPLE 6

100 grams of China-wood oil gel containing 0.1% boron trifluoride was ground to a fine powder.

(1) 50 grams of the powder were added to hot 95% ethanol and the mixture was stirred for 1½ hours. The mixture was filtered and the gel dried. The dried gel was added to 150 grams of a specially bodied varnish maker's linseed oil and the mixture was heated to a temperature of 520° F. in 15 minutes and kept at that temperature for 3¾ hours.

(2) The remaining 50 grams of untreated gel were added to another 150 grams of the same oil processed in (1) and the subsequent treatment was similar in every respect to the treatment set forth in (1).

For convenience in comparing the results obtained, the results are given in Table I.

Table I

| Oil Number | Viscosity (Gardner-Holdt) | Color (Gardner-Holdt) |
|---|---|---|
| 1 | $F_1$- | 10 |
| 2 | $F_2$ | 11 |

It must be noted that the isomerization catalytic activity of the gels of my invention, does not appear to depend on the boron trifluoride-content of the gels. Increasing the boron trifluoride-content does not increase the catalytic activity of the gels. As a matter of fact, the activity seems to decrease with increasing boron trifluoride-content. This is the opposite of the results obtainable when boron trifluoride alone is employed. This unexpected property of the gels of my invention was confirmed by a number of tests of which the following are typical:

EXAMPLE 7

50 gram portions of boron trifluoride-bodied China-wood oil gels, each portion containing different amounts of boron trifluoride, as set forth in Table II, were added to separate 150-gram samples of specially bodied varnish maker's linseed oil. The mixtures were heated to a temperature of 540° F. in ½ hour and maintained at this temperature for 1¼ hours. For convenience, the results obtained are set forth in Table II:

Table II

| Sample Number | 1 | 2 | 3 |
|---|---|---|---|
| Per cent Boron Trifluoride in Gel | 0.1 | 0.6 | 1.0 |
| Viscosity of Oil Produced (Gardner-Holdt) | W | V | S |
| Color of Oil Produced (Gardner-Holdt) | 13 | 8 | 10 |

EXAMPLE 8

The runs described in Example 7 were repeated with the following results:

Table III

| Sample Number | 1 | 2 | 3 |
|---|---|---|---|
| Per cent Boron Trifluoride in Gel | 0.1 | 0.6 | 1.0 |
| Viscosity of Oil Produced (Gardner-Holdt) | U | M | L |
| Color of Oil Produced (Gardner-Holdt) | 18 | 10 | 8 |

The results obtained in Examples 7 and 8 show clearly that the catalytic activity of the gels in bodying linseed oil definitely decreases with increasing boron trifluoride-content. This indicates that the catalytic activity of my gels is not due to boron trifluoride, but is a property of the gels themselves.

The use of the boron trifluoride-bodied China-wood oil gels of my invention makes possible rapid bodying of semi-drying oils, such as linseed oil, at temperatures as low as about 520° F. For example, if a specially bodied varnish maker's linseed oil is heated at temperatures of about 590° F., it takes slightly over two hours to body the oil to the stage where it may be used to make a varnish. On the other hand, a sample of the same oil heated in the presence of the gels of my invention, will reach the same stage in 1¼ hours at temperatures of about 540° F. This represents a substantial decrease in bodying temperature which is advantageous from the standpoint of reducing undesired secondary reactions, such as acid formation; a material reduction in the time required for effective bodying; and at the same time illustrates the catalytic activity of my boron trifluoride-bodied China-wood oil gels. Accordingly, the use of my gel catalysts in the isomerization of semi-drying oils, must be considered a preferred embodiment of my invention.

The amounts of boron trifluoride-bodied China-wood oil gels used in the isomerization of semi-drying oils, generally vary between about 5% and about 25%, with respect to the weight of oil in the charge. Larger amounts may be used, if desired, although no additional advantages seem to result therefrom.

Examples of drying and of semi-drying oils that are amenable to treatment in accordance with the process of my invention are linseed oil, soya bean oil, fish oil, dehydrated castor oil, and perilla oil, as well as mixtures of these with one another and/or oiticica oil and/or China-wood oil.

The isomerization reaction conditions of my process comprise temperatures that usually vary between about 450° F. and about 600° F., and preferably, between about 500° F. and about 550° F. The reaction period depends primarily, upon the temperature, and to a certain extent, upon the nature of the oil in the charge and the degree of bodying desired. I have found that ordinarily, treatment at temperatures varying between about 500° F. and about 550° F. for about 1 to 2 hours, is sufficient to produce the degree of bodying required in semi-drying oils.

It must be understood, of course, that the reaction variables are more or less interdependent, hence, when one is arbitrarily fixed, the limits within which the others may be varied are somewhat restricted. In any particular instance, the most desirable conditions can be readily ascertained by one skilled in the art, the working ranges of these variables having been indicated hereinbefore.

With respect to the manufacture of bodied oils, the process of the present invention may be broadly stated to comprise treating a drying or semi-drying oil containing unconjugated glycerides, with a China-wood oil gel obtained by contacting China-wood oil with boron trifluoride, under isomerization reaction conditions, and separating said China-wood oil gel from the oil.

Without any intended restriction of the scope of the present invention, the following examples are submitted as illustrative of the results obtainable with oils bodied in accordance with the process of the present invention:

EXAMPLE 9

The isomerized oils obtained in the tests set forth in Examples 4 and 5, were made into twenty-five gallon varnishes by heating the oils separately to a temperature of about 580° F. in ½ hour, adding ester gum to the heated oils and maintaining the mixtures at that temperature until the varnish bases reached the 12-inch cold string stage. This required about 40 minutes. The varnish bases thus obtained were used to prepare varnishes containing 50% non-volatile material and driers in amounts of

| | Per cent |
|---|---|
| Lead, based on the weight of the oil-content | 0.3 |
| Cobalt, based on the weight of the oil-content | 0.02 |
| Manganese, based on the weight of the oil-content | 0.02 |

Both varnishes were very viscous and had practically identical properties. These are tabulated in Table IV:

Table IV

| Source of Oil Used | Dust Dry, hours | Dry Hard | Boiling Water | Color |
|---|---|---|---|---|
| Example 4 | 3¼ | Overnight | No effect | Dark. |
| Example 5 | 3½ | do | do | Do. |

Example 10

The isomerized oils obtained in the tests set forth in Example 6, were made into twenty-five gallon ester gum varnishes containing 50% non-volatile material and driers in amounts of

|  | Per cent |
|---|---|
| Lead, based on the weight of the oil-content | 0.3 |
| Cobalt, based on the weight of the oil-content | 0.02 |
| Manganese, based on the weight of the oil-content | 0.02 |

Both varnishes had practically identical properties. These are tabulated in Table V:

Table V

| Source of Oil Used Example 6 | Heating Time in Minutes | Dust Dry in Minutes | Dry Hard | Viscosity (Gardner-Holdt) | Color (Gardner-Holdt) |
|---|---|---|---|---|---|
| (1) | 70 | 105 | Overnight | F | 16 |
| (2) | 60 | 105 | do | G | 17 |

Example 11

The isomerized oils obtained in tests 1 and 2 of Example 7 and in test 3 of Example 8, were made into twenty-five gallon ester gum varnishes containing 50% non-volatile material and driers in amounts of

|  | Per cent |
|---|---|
| Lead, based on the weight of the oil-content | 0.3 |
| Cobalt, based on the weight of the oil-content | 0.02 |
| Manganese, based on the weight of the oil-content | 0.02 |

The results obtained are tabulated in Table VI:

Table VI

| Source of Oil Used | Heating Time in Minutes | Dust Dry in Minutes | Dry Hard, Hours | Boiling Water | Color (G.-H.) | Viscosity (G.-H.) |
|---|---|---|---|---|---|---|
| Example 7-1 | 55 | 45 | 24 | No effect | 17 | C |
| Example 7-2 | 70 |  | 24 | do | 17 | B |
| Example 8-3 | 100 | 40 | 24 | do | 17 | A |

These results show that the color of the varnishes appears to be independent of the color of the oil employed. The drying properties of the varnishes were excellent in all three cases.

Although the present invention has been described in conjunction with preferred embodiments, it is to be understood that modifications and variations may be resorted to without departing from the spirit and scope of the invention, as those skilled in the art will readily understand. Such variations and modifications are considered to be within the purview and scope of the appended claims.

I claim:

1. The process which comprises treating an oil selected from the class consisting of drying oils and semi-drying oils, at a temperature falling within the range varying between about 450° F. and about 600° F., with a boron trifluoride-bodied China-wood oil gel.

2. The process which comprises treating linseed oil, at a temperature falling within the range varying between about 450° F. and about 600° F., with a boron trifluoride-bodied China-wood oil gel.

3. The process of preparing a varnish base, which comprises treating an oil selected from the class consisting of drying oils and semi-drying oils, at a temperature falling within the range varying between about 450° F. and about 600° F., with a boron trifluoride-bodied China-wood oil gel, and separating said gel from said oil.

4. The process of preparing a varnish base, which comprises treating linseed oil, at a temperature falling within the range varying between about 450° F. and about 600° F., with a boron trifluoride-bodied China-wood oil gel, and separating said gel from said linseed oil.

5. The process which comprises treating linseed oil at temperatures varying between about 450° F. and about 600° F., with a boron trifluoride-bodied China-wood oil gel, for about 1 to 2 hours.

6. The process of preparing a varnish base, which comprises treating linseed oil at temperatures varying between about 500° F. and about 550° F., with a boron trifluoride-bodied China-wood oil gel for about 1 to 2 hours, and separating said gel from said linseed oil.

7. The process which comprises treating an oil selected from the class consisting of drying oils and semi-drying oils, with a boron trifluoride-bodied China-wood oil gel, at a temperature falling within the range varying between about 500° F and about 550° F.

8. The process which comprises treating a linseed oil with a boron trifluoride-bodied China-wood oil gel, at a temperature falling within the range varying between about 500° F. and about 550° F.

9. The process of preparing a varnish base, which comprises treating an oil selected from the class consisting of drying oils and semi-drying oils, with a boron trifluoride-bodied China-wood oil gel, at a temperature falling within the range varying between about 500° F. and about 550° F., and separating said gel from said oil.

10. The process of preparing a varnish base, which comprises treating a linseed oil with a boron trifluoride-bodied China-wood oil gel, at a temperature falling within the range varying between about 500° F. and about 550° F., and separating said gel from said linseed oil.

CHARLES J. PLANK.

REFERENCES CITED

The following references are of record in the file of this patent:

UNITED STATES PATENTS

| Number | Name | Date |
|---|---|---|
| 2,283,872 | Pratt | May 19, 1942 |
| 2,084,137 | Geiger | June 15, 1937 |
| 2,260,417 | Whiteley | Oct. 28, 1941 |
| 1,915,555 | Sommer | June 27, 1933 |
| 414,723 | Robinson | Nov. 12, 1889 |
| 1,811,130 | Hofmann et al. | June 23, 1931 |
| 1,933,434 | Hofmann et al. | Oct. 31, 1932 |